(12) United States Patent
Williams et al.

(10) Patent No.: US 8,800,200 B1
(45) Date of Patent: Aug. 12, 2014

(54) METHOD AND APPARATUS FOR CONTROLLING SUBTERRANEAN PESTS

(75) Inventors: Terry W. Williams, Brighton, CO (US); Billy G. Martin, Brighton, CO (US)

(73) Assignee: UPCS LLC, Brighton, CO (US)

( * ) Notice: Subject to any disclaimer, the term of this patent is extended or adjusted under 35 U.S.C. 154(b) by 214 days.

(21) Appl. No.: 13/162,443

(22) Filed: Jun. 16, 2011

(51) Int. Cl.
*A01M 13/00* (2006.01)

(52) U.S. Cl.
USPC .................................. 43/125; 43/127; 43/124

(58) Field of Classification Search
USPC .............................................. 43/124, 125, 127
IPC .............................................. A01M 13/00,17/00
See application file for complete search history.

(56) References Cited

U.S. PATENT DOCUMENTS

| 192,905 | A | * | 7/1877 | Dreyer | 43/127 |
|---|---|---|---|---|---|
| 724,305 | A | * | 3/1903 | MacFarland | 43/127 |
| 1,090,280 | A | * | 3/1914 | Coldiron | 43/127 |
| 1,492,732 | A | | 5/1924 | Knopf | |
| 1,637,254 | A | * | 7/1927 | Gomez | 43/127 |
| 2,467,922 | A | | 4/1949 | Woytal et al. | |
| 2,745,210 | A | * | 5/1956 | Hild | 43/125 |
| 3,017,121 | A | * | 1/1962 | Carlson | 239/129 |
| 3,607,780 | A | * | 9/1971 | Scott | 42/19 |
| 4,026,330 | A | | 5/1977 | Dunn | |
| 4,048,746 | A | | 9/1977 | Dye | |
| 4,512,102 | A | | 4/1985 | Long | |
| 4,829,706 | A | | 5/1989 | Perry | |
| 4,833,818 | A | | 5/1989 | Berta | |
| 4,906,032 | A | | 3/1990 | Hohman | |
| 5,109,629 | A | | 5/1992 | King, Jr. et al. | |
| 5,588,252 | A | | 12/1996 | Jones | |
| 5,700,039 | A | | 12/1997 | Manning | |
| 6,171,098 | B1 | | 1/2001 | Meyer et al. | |
| 6,698,367 | B1 | * | 3/2004 | Decouzon | 111/118 |
| 7,581,349 | B2 | | 9/2009 | Hurlburt | |
| 7,752,802 | B2 | | 7/2010 | McDonald | |
| 8,567,112 | B2 | * | 10/2013 | Tikalsky | 43/124 |
| 8,640,636 | B2 | * | 2/2014 | des Garennes et al. | 111/7.3 |
| 2011/0197495 | A1 | * | 8/2011 | Shaw | 43/125 |
| 2011/0203162 | A1 | * | 8/2011 | Cink et al. | 43/124 |
| 2011/0277373 | A1 | * | 11/2011 | Robbins | 43/125 |

FOREIGN PATENT DOCUMENTS

GB 2391445 A * 2/2004 ............ A01M 13/00

* cited by examiner

*Primary Examiner* — Darren W Ark
*Assistant Examiner* — Lisa Tsang
(74) *Attorney, Agent, or Firm* — Aileen Law; Oppedahl Patent Law Firm LLC

(57) ABSTRACT

A self-contained, cart-mounted extermination device having an internal combustion engine which produces an exhaust gas containing an asphyxiant is disclosed. The disclosed device provides an effective and humane means to eradicate subterranean pests which is portable, rugged, compact and simple to use and maneuver.

20 Claims, 3 Drawing Sheets

METHOD AND APPARATUS FOR CONTROLLING SUBTERRANEAN PESTS

TECHNICAL FIELD OF ART

The disclosed device relates generally to devices for pest extermination, and more specifically to a method and apparatus for the eradication of burrowing animals such as rabbits, prairie dogs, gophers, moles and other such subterranean pests.

BACKGROUND

It is well-known that burrowing animals will build holes in a ground surface which are connected to underground passageways thereunder. Such subterranean burrows systems can often be large and extensive and can include many twisted passages. Using these burrows, subterranean pests destroy grass, crops, plants and other vegetation by eating the roots from below the surface. In addition, the burrowing action of the animals into and through the soil can produce unsightly holes and cavings in the ground. Stripped of vegetation, the areas around these subterranean burrow systems can experience soil erosion. The mounds commonly formed by the burrowing animals are known to cause damage to machinery and often cause harm to livestock and people accessing these properties, e.g. owners, farmers, ranchers, children. Consequently, subterranean animals present a number of problems for residential yards, parks, golf courses, farms, and other planted areas.

Various types of devices and methods have been devised for the extermination of subterranean pests. Some types employ traps or solid poisons deposited within the burrow system, which when encountered by the burrowing animal can result in an instant or sometimes, delayed death. Others may employ the injection of a flammable gas and the subsequent detonation of the gas. Another system employs explosive charges situated within the device which, when exploded, sends fragments, pressure and concussive waves throughout the burrow system thereby killing the animals within the burrow. It is conceivable that these afore-mentioned types of eradication methods cause pain, suffering and trauma to the burrowing animals, especially when death is not immediate.

Other eradication methods may employ poisonous or fumigation gases injected into the burrow to asphyxiate the subterranean pests. The use of toxic compounds, however, can have adverse effects on people, pets, birds and other animals that are accidentally exposed to the poison. In addition, the toxic compounds used can potentially leach hazardous substances into the adjacent soil, lakes and streams, causing harm to plants, crops, and other vegetation. Although, the sanctioned shooting of burrowing animals can be another method of pest control, the use of firearms adjacent residential properties and parks, etc. may not be a feasible alternative.

The use of exhaust gas fumes from a gasoline engine is known to be an effective and relatively humane means of asphyxiating burrowing animals. In comparison with poisonous gases, the use of exhaust gas has lower toxic effects to the surrounding environment. Some systems utilizing engine exhaust gas have employed a flexible hose connected to the exhaust pipe of an automobile in conjunction with a mixing apparatus to inject the asphyxiating exhaust into a subterranean burrow system. However, a system requiring an automobile or other large engine powered vehicle can be cumbersome and costly to operate. Other systems employ a direct connection to the exhaust of a small gasoline engine, such as that from a lawn mower, a leaf blower, or a chain saw, and conveying the fumes from the exhaust into a subterranean burrow system. Some of these devices are hand-held. Others require some manner of set-up before operation can take place.

The disclosed device provides an effective and humane means to eradicate subterranean pests which is portable, rugged, compact and simple to use. In addition, the disclosed device can be easily moved about without requiring a significant amount of effort. This can be advantageous for use with smaller acreages such as residential yards, parks, and golf courses. The durability and sturdiness of the system provides for a safe and reliable mobile unit for injecting exhaust gas into a subterranean burrow system from a direct-mounted internal combustion engine.

SUMMARY OF THE DISCLOSURE

The disclosed system provides a durable device for transmitting exhaust gas from a direct-mounted internal combustion engine into a subterranean burrow system to asphyxiate subterranean pests.

The disclosed device provides an effective and humane means to eradicate subterranean pests in a cost-efficient manner and which is easy to use.

The disclosed device provides a compact, rugged and portable mechanism that can be conveniently moved over a desired acreage.

The disclosed device provides a frame having a hollow passageway which conveys cooled muffled gas to one or more exit ports whereupon it can be injected into a subterranean burrow system.

The disclosed device provides a cooling resonance chamber where exhaust gas passes before entering into the tubular chamber of frame.

The disclosed device provides cooled muffled exhaust which is useful to axsphyxiate subterreanan pests in a less traumatic, pain-free manner.

The disclosed device provides for control of the sound and heat produced by the engine exhaust.

The disclosed device provides a modified platform for the mounting of an internal combustion engine.

The disclosed device provides a recessed receptacle area into which an engine can be mounted.

The disclosed device provides for an installation of the engine such that the exhaust port of the engine will be plumb with the upper surface of the frame.

The disclosed device provides for the discharge of condensation, which forms on surfaces of the disclosed device as a result of the cooling of the hot exhaust gas.

These and other features and advantages of the disclosed apparatus reside in the construction of parts and the combination thereof, the mode of operation and use, as will become more apparent from the following description, reference being made to the accompanying drawings that form a part of this specification wherein like reference characters designate corresponding parts in the several views. The embodiments and features thereof are described and illustrated in conjunction with systems, tools and methods which are meant to exemplify and to illustrate, not being limiting in scope.

Before explaining the disclosed embodiments in detail, it is to be understood that the embodiments are not limited in application to the details of the particular arrangements shown, since other embodiments are possible. Also, the terminology used herein is for the purpose of description and not of limitation.

DETAILED DESCRIPTION OF THE FIGURES

The disclosed system provides for a device for transmitting exhaust gas from a direct-mounted gasoline engine into a subterranean burrow system to asphyxiate subterranean pests.

Figure 1:
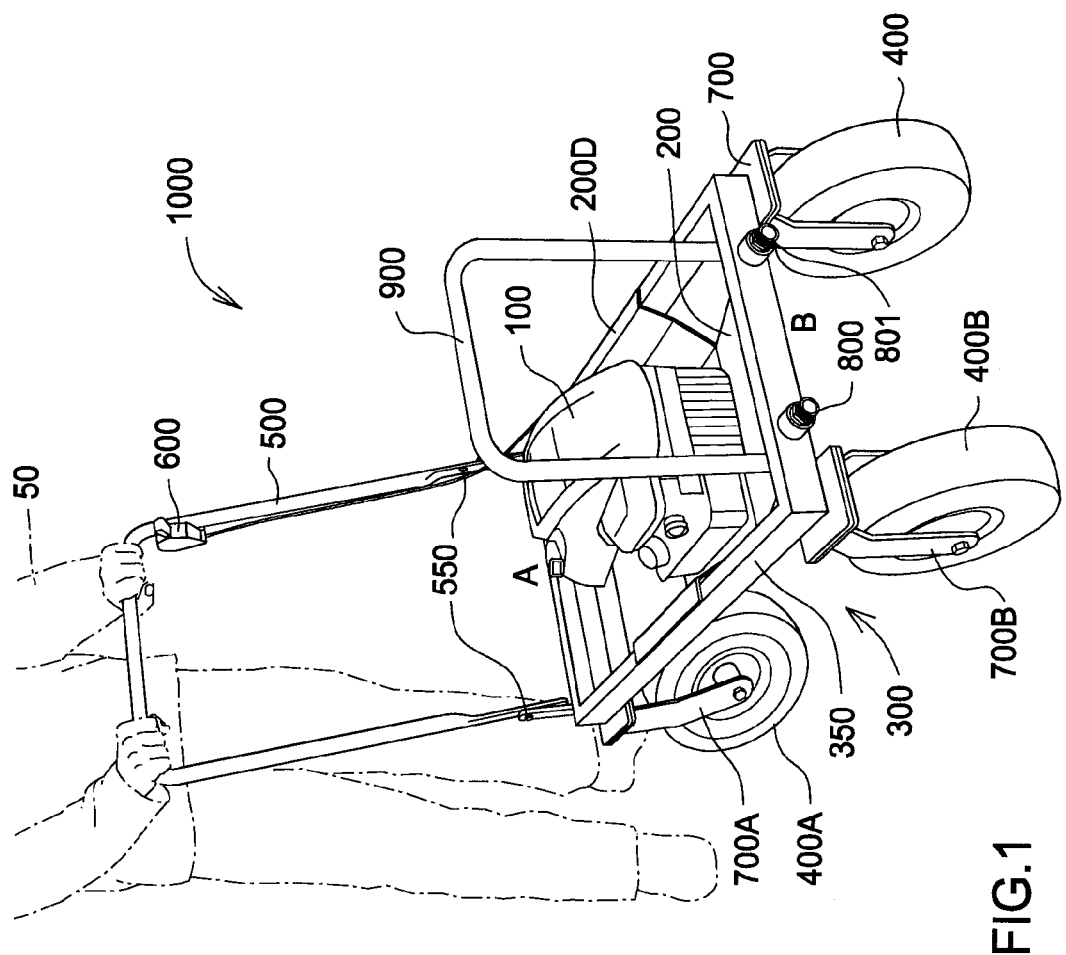
FIG. 1 depicts one embodiment of the disclosed device having a handle by which a user may direct the movement of the device.
Figure 3:
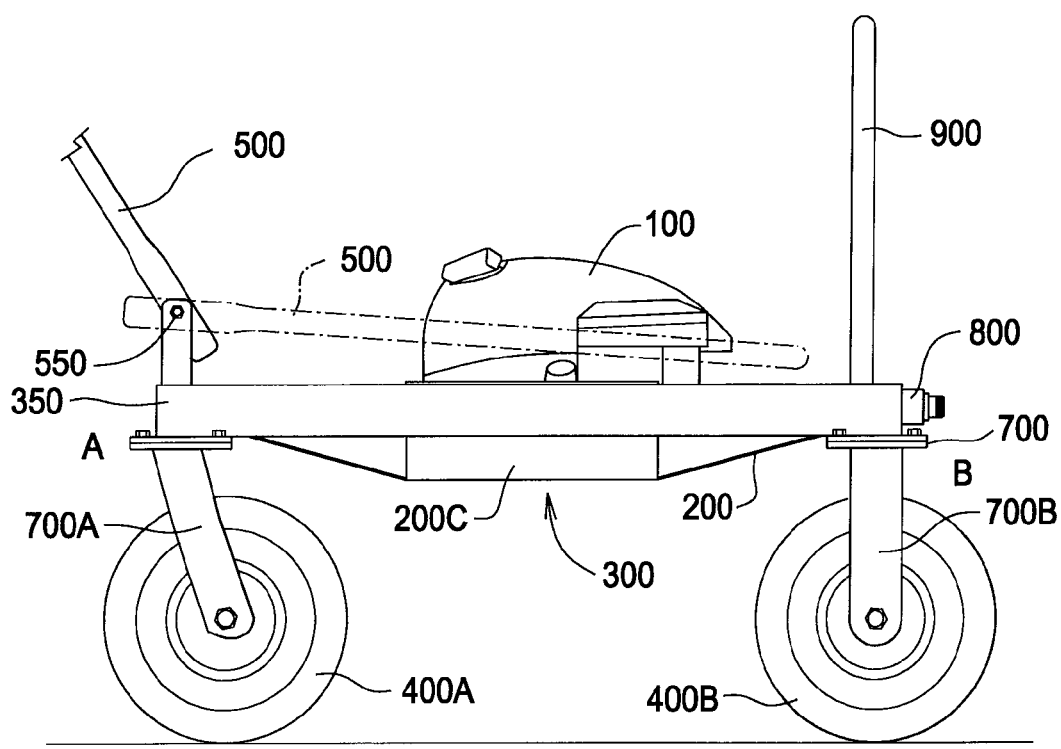
FIG. 3 is an elevation view of the embodiment shown in FIG. 1, wherein the handle is shown in dotted line format to be in an optional, collapsed or folded position.
Figure 5:
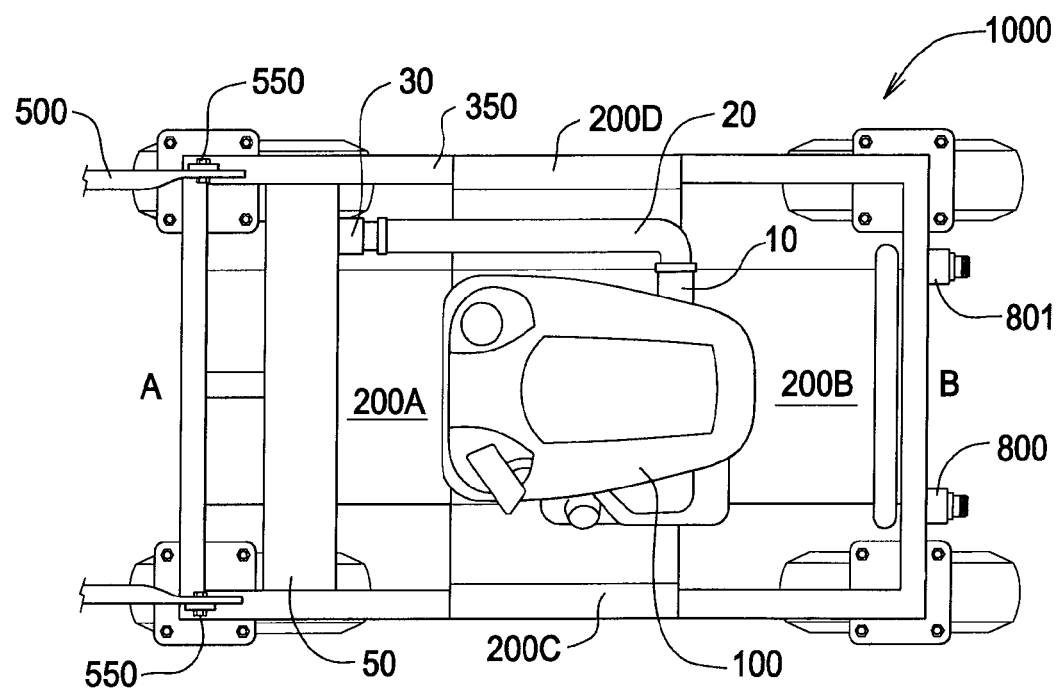
FIG. 5 is a top view of the embodiment shown in FIG. 1.

As shown in FIGS. 1, 3 and 5, system 1000 comprises engine 100 supported on skid plate 200 of cart 300. Handle 500 is mounted to end A of cart 300. In operation, user 50 can direct the movement of cart 300 by means of handle 500. Handle 500 may be disengaged from its upright position by loosening fasteners 550 whereby it may be hingedly collapsed into a folded position to enable storage of system 1000. In this embodiment, engine 100 is a Briggs & Stratton 450 Series and comprises a starter grip 600 which serves as a throttle. For convenience, starter grip 600 is shown fastened on handle 500. In other embodiments having alternate engine types, starter grip 600 could be mounted elsewhere or absent.

Wheels 400 comprise plate casters 700 mounted to a bottom surface of frame 350 to facilitate ease of movement of cart 300. In one embodiment of the disclosed device, wheels 400A comprise swivel casters 700A to enable the wheels to roll in a desired direction without having to change the orientation of cart 300. When in motion along a straight line, swivel casters 700A will tend to automatically align and rotate parallel to the direction of the travel of cart 300. Thus, precise steering is not required because casters 700A will tend to maintain a relatively straight motion.

Wheels 400B comprise rigid casters 700B which will tend to restrict the motion of wheels 700B. Thus, the front of cart 300 travels along a straight line. When turning, swivel casters 700A rotate parallel to the turning radius to provide a substantially smooth turn. Pneumatic wheels (air-filled rubber) with a sawtooth tread were selected for increased puncture resistance and to provide a lower wear rate and to accommodate rugged terrain. Those having skill in the art will readily recognize that other types of wheels and caster configurations may be selected depending on the desired specifications.

Figure 2:
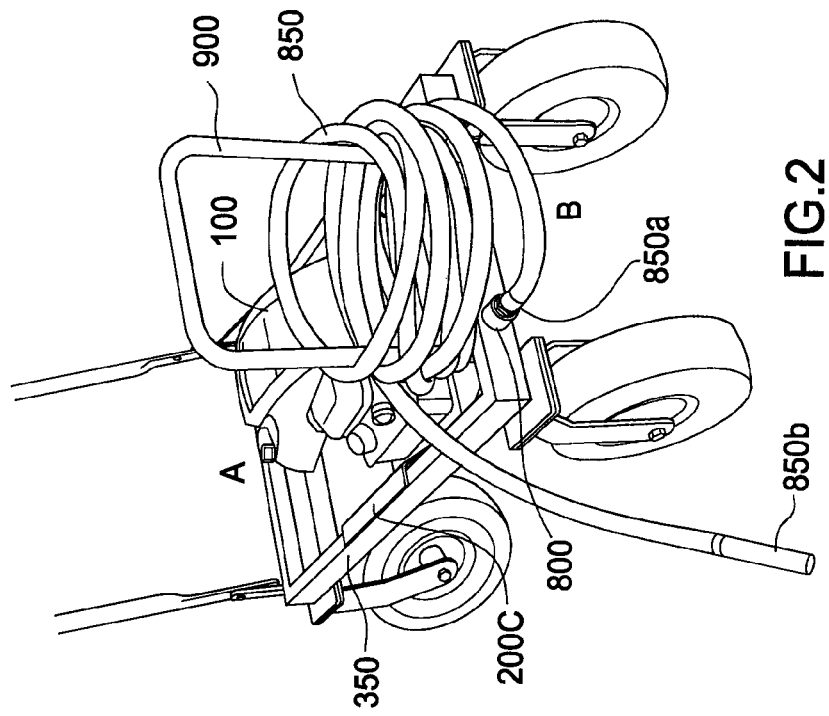
FIG. 2 depicts the inclusion of at least one flexible hose, wherein a free end thereof can be placed into a subterranean burrow system.

Frame 350 is formed from square tube and comprises a pair of couplings which serve as exhaust ports 800, 801. As shown in FIG. 2, flexible hose 850 is connectable to exhaust port 800 to direct exhaust gas from engine 100 into a subterranean burrow system (not shown). Although end 850a of flexible hose 850 is threadably connectable to exhaust port 800, other types of connecting mechanisms can be used. For example, one having skill in the art would recognize that a quick coupling system could be employed to removably connect a flexible hose to exhaust ports of the disclosed system.

Flexible hose 850 is shown storable on hose support 900. The length of flexible hose 850 is not fixed, however, it is contemplated that a length of about 10 to about 25 feet may be convenient. In this way, gas can be injected into multiple entrances with minimal movement of system 1000. In one embodiment, a heavy duty, high-temperature garden hose with standard threaded connection ends was selected; however others could be employed if desired. If extra hose length is required, one or more additional garden hoses can be coupled one to another.

As shown, exhaust ports 800, 801 are positioned at an end B of cart 300, opposite handle 500. One having skill in the art would recognize that various configurations and quantities of exhaust ports are possible without departing from the spirit and scope of the present disclosure. For example, one embodiment of the disclosed device contemplates the use of three exhaust ports instead of two exhaust ports. Additional lengths of flexible hose are also contemplated and can provide for the injection of exhaust gas into a plurality of entrances of a subterranean burrow system. Injecting gas into several entrances of a subterranean burrow system at the same time may help to minimize escape by the burrowing animals. In addition, it may result in the maximizing gas contact so as to kill burrowing animals in a less traumatic, pain-free manner.

Figure 4:
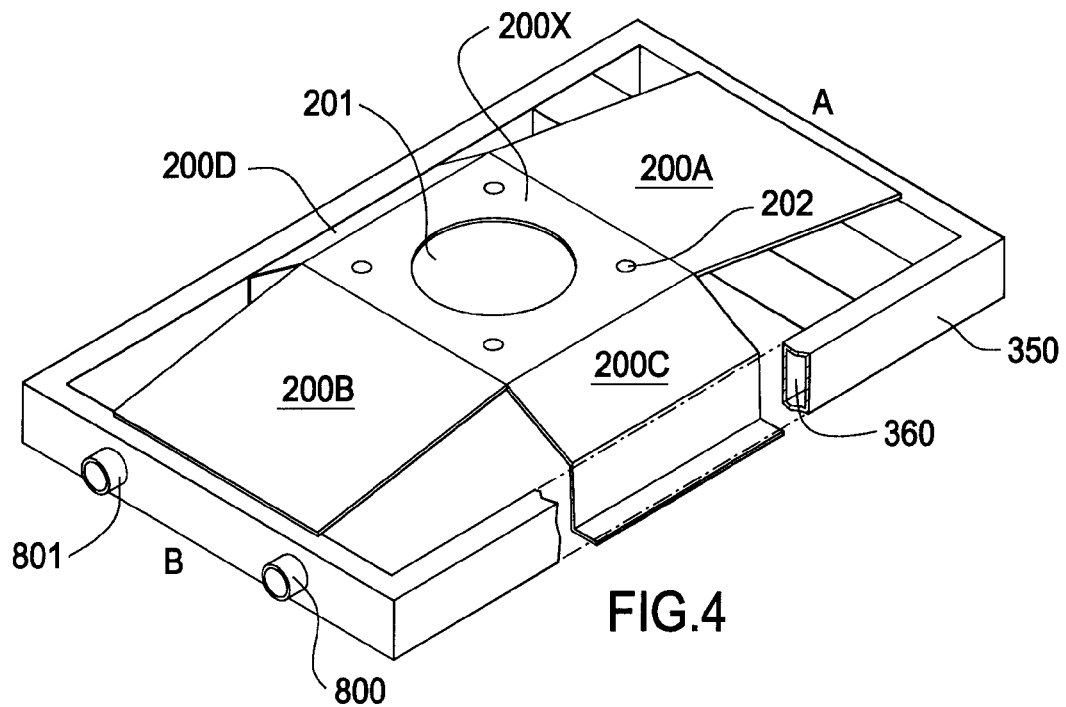
FIG. 4 is an underside perspective view of the skid plate which supports the internal combustion engine of the disclosed device.

FIG. 4 is an underside perspective view of skid plate 200 which comprises plate portions 200A, 200B, 200C, 200D and center plate 200X, all formed from a singular sheet of metal plate. An outer edge of plate portion 200A is fixedly attached to frame 350 adjacent cart end A. Similarly, an outer edge of plate portion 200B is fixedly attached to frame 350 adjacent cart end B. Plate portions 200A, 200B slope inwardly toward the intersection boundary of center plate 200X.

An outer edge of each of plate portions 200C, 200D is fabricated to seat over a top surface of frame 350 and is fixedly attached thereto. See also FIGS. 1, 2, 5. Plate portions 200C, 200D slope inwardly toward the intersection boundary of center plate 200X. As can be better seen in FIG. 3, center plate 200X extends past a bottom edge of frame 350.

Together with frame 350, skid plate 200 forms a recessed receptacle area into which engine 100 can be positioned. The depth of the receptacle area is such that the exhaust port (exposed by the removal of the muffler) of engine 100 will be plumb with the upper surface of frame 350. Condensation, which forms on surfaces of the disclosed device as a result of the cooling of the hot exhaust gas, can be discharged from the receptacle area around the edges of skid plate 200. It is contemplated that skid plate 200 can comprise perforated or mesh plate to provide for increased drainage. In the embodiment of FIG. 4, center plate 200X portion comprises hole 201 to facilitate the seating and mounting of a bottom surface of engine 100. Other embodiments may not comprise a hole, in which case center plate 200X would be substantially uniform thereacross.

A bottom housing of engine 100 can be mounted to skid plate 200 by means of bolts (not shown) and one or more bolt holes 202 which support engine 100 in cart 200 of the disclosed device. Although not shown, rubber washers could be used in the mounting of engine 100 on skid plate 200. One having skill in the art would recognize that various configurations and quantities of engine mount configurations are possible without departing from the spirit and scope of the present disclosure. For example, one embodiment of the disclosed device contemplates the use of three bolt holes instead of four bolt holes.

Figure 6:
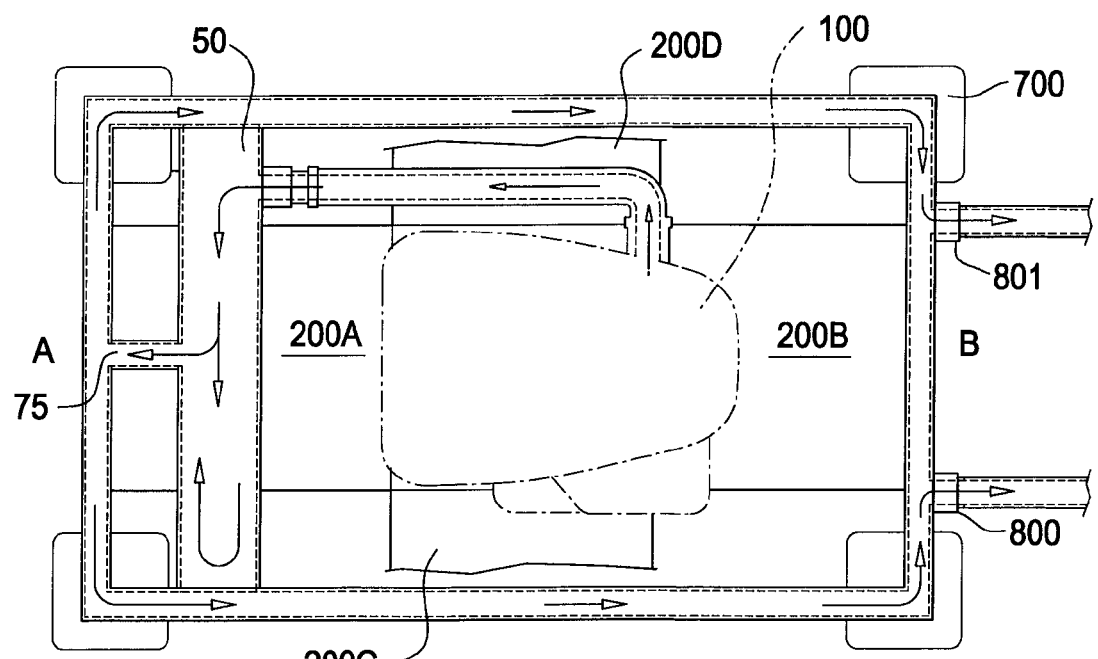
FIG. 6 depicts the flow of the exhaust gas from the internal combustion engine through the disclosed device.

FIG. 6 depicts the flow of the exhaust gas from the internal combustion engine 100 which is the source of pressurized air which exhausts its combustion products through exhaust ports 800, 801 of the disclosed device. In operation, the combustion of gasoline used in engine 100 produces carbon monoxide which is an effective asphyxiant for subterranean pests.

Lawnmower exhaust ports typically comprise holes having about a ½" diameter or about a ¾" inch diameter in the engine block that have internal pipe threads. After the removal of the muffler of from a lawn mower engine, a rigid threaded fitting 10 is removably connected to the exhaust port of engine 100. See FIG. 5. An end of conduit 20 is threadably connected to a receiving end of fitting 10. Conduit 20 can be rigid or flexible. An opposite end of conduit 20 is threadably connected to a receiving end of coupling 30 which is mounted to manifold 50. When engine 100 is started, exhaust gas comprising mainly carbon monoxide is passed through conduit 20 to free-flow manifold 50 where it is routed to frame 350 via conduit 75 as depicted by the directional arrows.

The disclosed device provides for control of the sound and heat produced by the engine exhaust. Manifold 50 operates as a cooling resonance chamber where exhaust gas passes before entering into the tubular chamber 360 of frame 350. See also FIG. 4. Cooled muffled exhaust exits frame 350 through exhaust ports 800, 801 located at end B.

The embodiments disclosed herein depict the mounting of engine 100 such that the engine exhaust port and coupling 30 are positioned on the left half of system 1000. It is contemplated that in some cases, engine 100 could be mounted such that the engine exhaust port and coupling 30 are positioned on the right half of system 1000.

Flexible hoses convey the cooled, muffled exhaust into the desired subterranean burrow systems. The cool, quiet exhaust gently fills the burrow with carbon monoxide which euthanizes the subterranean pests with little or no trauma or pain. Thus, the disclosed device arguably provides for the most humane method of controlling subterranean pests. In addition, the exhaust passing through the subterranean burrow system is relatively innocuous to the soil. After the exhaust dissipates to the soil or to atmosphere, the residuals would not present a danger for animals, birds, pets, children or the environment.

To accommodate strength, weight and corrosion considerations, frame 350 can be constructed from aluminum or other lightweight metal alloy. Depending on the application, handle 500 can be constructed from round or square tubing and may comprise a lightweight metal alloy or steel. In one embodiment, it was determined that system 1000 weighed about 22.7 kg (about 50 lb).

The rugged, durable construction of this machine makes it easy to use, cost-effective in operation and very effective in exterminating subterranean pests. In addition, the disclosed device is easy to maneuver and small enough in size to be utilized on small acreages. The disclosed device allows a user to obtain and keep control of pest problems over time and provides a cost effective and safe alternative to using more toxic compounds. Further, the disclosed device is not likely to create more property damage, such as leaving ruts on the land as an automobile-mounted system would.

As disclosed herein, an extermination unit utilizing gas exhaust produced by an internal combustion engine comprises a substantially rectangular frame having a hollow passageway therethrough, the frame forming a boundary within which a base plate is mounted, the frame further comprising at least one exit port in communication with the hollow passageway, the base plate forming a platform upon which an internal combustion engine is mounted. A delivery conduit connected to an exhaust orifice of the engine conveys heated exhaust from the engine to a manifold in communication with the hollow passageway, the heated exhaust being partially cooled and muffled in the manifold prior to its passage into the hollow passageway, the hollow passageway providing further cooling and muffling of the exhaust. A length of hose is connectable to at least one exit port to convey cooled, muffled exhaust from the hollow passageway to an entrance of a subterranean burrow system capable of housing one or more subterranean pests, whereby the one or more subterranean pests may be exterminated.

A portable apparatus for controlling subterranean pests comprises a substantially rectangular frame having a hollow passageway therethrough, the frame forming a boundary within which a base plate is mounted, the frame further comprising at least one exit port in communication with the hollow passageway. The base plate further comprises a pair of opposing tab sections located longitudinally on either side of a center portion of the base plate and a pair of opposing tab sections located latitudinally on either side of the center portion, an outer edge of each of the tab sections sloping upwardly from the center portion to its respective attachment with the frame, whereby a receptacle area is formed, the receptacle area forming a depressed platform into which an internal combustion engine is mounted. A delivery conduit connected to an exhaust orifice of the engine conveys heated exhaust from the engine to a manifold in communication with the hollow passageway, the heated exhaust being partially cooled and muffled in the manifold prior to its passage into the hollow passageway, the hollow passageway providing further cooling and muffling of the exhaust. A length of hose connectable to at least one exit port conveys cooled, muffled exhaust from the hollow passageway to an entrance of a subterranean burrow system capable of housing one or more subterranean pests, whereby one or more subterranean pests may be exterminated. A plurality of wheels mounted to a bottom surface of the frame enables transport of the apparatus.

A cart-mounted extermination device having an internal combustion engine which produces an exhaust containing an asphyxiant comprises a cart comprising a substantially rectangular frame having a hollow passageway and at least one exit port in communication therewith, a base plate mounted within an inner boundary formed by the frame, and a plurality of wheels mounted to a bottom surface of the frame. The base plate further comprises a pair of opposing tab sections located longitudinally on either side of a center portion of the base plate and a pair of opposing tab sections located latitudinally on either side of the center portion, an outer edge of each of the tab sections sloping upwardly from the center portion to its respective attachment with the frame, whereby a recessed area is formed. An internal combustion engine is mounted in the recessed area. The cart comprises a handle. A delivery conduit connected to an exhaust orifice of the engine conveys heated exhaust from the engine to a manifold in communication with the hollow passageway, the heated exhaust being partially cooled and muffled in the manifold prior to its passage into the hollow passageway, the hollow passageway providing further cooling and muffling of the exhaust. A length of hose connectable to at least one exit port conveys cooled, muffled exhaust from the hollow passageway to an entrance of a subterranean burrow system to asphyxiate one or more subterranean pests housed therein.

While a number of exemplifying features and embodiments have been discussed above, those of skill in the art will recognize certain modifications, permutations, additions and subcombinations thereof. Other alternate embodiments of the present apparatus could easily be employed by those skilled in the art to achieve the functions of the present apparatus and methodology. It is to be understood that additions, deletions, and changes may be made to the system and various internal and external functions disclosed herein, and still fall within the true spirit and scope of the disclosure. No limitation with respect to the specific embodiments disclosed herein is intended or should be inferred.

We claim:

1. An extermination device utilizing gas exhaust produced by an internal combustion engine, said device comprising:
   a first pair of parallel members mounted at right angles to a second pair of parallel members to form a tubed passageway through which a gas exhaust may be ducted and wherein a bounded space between said first and said second parallel members is formed;
   a platform mounted in said bounded space, said platform and said tubed passageway forming a recessed area within which a bottom portion of said internal combustion engine is directly supported;
   a bottom of said platform supporting said engine being distally located above a corresponding ground surface so as to avoid direct contact thereof and to promote movability of said device;
   a delivery conduit to convey heated exhaust from said engine to a manifold in communication with said tubed passageway;
   said heated exhaust being partially cooled and muffled in said manifold prior to free flowing into said tubed passageway, said tubed passageway providing further cooling and muffling of said exhaust; and
   a length of hose connectable to said at least one exit port to convey free-flowing cooled, muffled exhaust from said tubed passageway to an entrance of a subterranean burrow system capable of housing one or more subterranean pests, whereby said one or more subterranean pests may be exterminated.

2. The device of claim 1 further comprising a plurality of wheels mounted to a bottom surface of said tubed passageway to enable transport of said device.

3. The device of claim 2, wherein at least one pair of said wheels further comprises swivel casters.

4. The device of claim 2, wherein at least one pair of said wheels further comprises rigid casters.

5. The device of claim 1 further comprising a handle mounted to said tubed passageway to direct a movement of said device.

6. The device of claim 5, wherein said handle is collapsible.

7. The device of claim 1, further comprising a hose support whereby said length of hose can be stored.

8. The device of claim 1, wherein said recessed area further comprises a center portion bounded by a pair of upwardly sloping sides.

9. The device of claim 1, wherein said internal combustion engine is a lawnmower engine.

10. The device of claim 1, wherein said gas exhaust comprises an asphyxiant.

11. A portable apparatus for controlling subterranean pests, said apparatus comprising:
    a tubed passageway comprising a manifold through which a gas exhaust can be ducted;
    a platform mounted to said tubed passageway, said platform further comprising a recessed receptacle area having a substantially flat center portion and a pair of upwardly sloping sides within which a bottom portion of an internal combustion engine is directly supported;
    a delivery conduit to convey heated exhaust from said engine to said manifold;
    said heated exhaust being partially cooled and muffled in said manifold prior to free flowing into said tubed passageway, said tubed passageway providing further cooling and muffling of said exhaust;
    a length of hose connectable to said at least one exit port to convey free-flowing cooled, muffled exhaust from said tubed passageway to an entrance of a subterranean burrow system capable of housing one or more subterranean pests, whereby said one or more subterranean pests may be exterminated; and
    a plurality of wheels mounted to a bottom surface of said tubed passageway to enable transport of said apparatus.

12. The apparatus of claim 11 further comprising a collapsible handle mounted to said tubed passageway to direct a movement of said device.

13. An extermination device having an internal combustion engine capable of producing an exhaust containing an asphyxiant, said device comprising:
    a tubed passageway through which said exhaust is ducted, said tubed passageway comprising a base plate mounted within an inner boundary thereof, said tubed passageway comprising a plurality of wheels mounted thereto;
    said base plate further comprising a center portion and a pair of upwardly sloping sides, said internal combustion engine mounted on said center portion of said base plate between said pair of upwardly sloping sides;
    said tubed passageway having a handle;
    a delivery conduit to convey heated exhaust from said engine to a manifold in communication with said tubed passageway;
    said heated exhaust being partially cooled and muffled in said manifold prior to freely flowing into said tubed passageway, said tubed passageway providing further cooling and muffling of said exhaust; and
    a length of hose connectable to said at least one exit port to convey free-flowing cooled, muffled exhaust from said tubed passageway to an entrance of a subterranean burrow system to asphyxiate one or more subterranean pests housed therein.

14. The device of claim 13, wherein said handle is collapsible.

15. The device of claim 13, wherein said internal combustion engine is a lawnmower engine.

16. The device of claim 13, wherein said handle and said frame form a basis of a cart.

17. An extermination device utilizing gas exhaust produced by an internal combustion engine, said device comprising:
    a first pair of parallel members mounted at right angles to a second pair of parallel members to form a tubed passageway through which a gas exhaust may be ducted;
    a recessed platform mounted within a boundary of said tubed passageway and comprising a center portion and a pair of upwardly sloping sides, said recessed platform directly supporting a bottom portion of said internal combustion engine;
    a delivery conduit to convey heated exhaust from said engine to said tubed passageway;
    said heated exhaust being cooled and muffled in said tubed passageway; and
    wherein freely flowing cooled, muffled exhaust is conveyable from said tubed passageway to an entrance of a subterranean burrow system capable of housing one or more subterranean pests, whereby said one or more subterranean pests may be exterminated.

18. The device of claim 17 further comprising a plurality of wheels mounted to said tubed passageway to enable transport of said device.

19. The device of claim 17 further comprising a handle mounted to said tubed passageway to direct a movement of said device.

20. The device of claim 17, wherein said tubed passageway comprises a manifold.

\* \* \* \* \*